United States Patent
Matsushita et al.

(10) Patent No.: US 8,284,459 B2
(45) Date of Patent: Oct. 9, 2012

(54) IMAGE PROCESSING APPARATUS AND IMAGE PROCESSING METHOD

(75) Inventors: Masahiro Matsushita, Yokohama (JP); Hirotaka Shiiyama, Yokohama (JP); Hidetomo Sohma, Yokohama (JP); Koichi Magai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 670 days.

(21) Appl. No.: 12/485,378

(22) Filed: Jun. 16, 2009

(65) Prior Publication Data

US 2009/0316228 A1    Dec. 24, 2009

(30) Foreign Application Priority Data

Jun. 23, 2008   (JP) .................................. 2008-163665

(51) Int. Cl.
*H04N 1/04* (2006.01)

(52) U.S. Cl. ......... 358/474; 358/448; 358/496; 358/497

(58) Field of Classification Search .................. 358/474, 358/448, 496, 497, 498

See application file for complete search history.

(56) References Cited

U.S. PATENT DOCUMENTS

| | | | | |
|---|---|---|---|---|
| 5,680,478 A | * | 10/1997 | Wang et al. | .................... 382/176 |
| 2009/0097066 A1 | | 4/2009 | Fukudome | |

FOREIGN PATENT DOCUMENTS

| | | |
|---|---|---|
| JP | 2003189096 A | 7/2003 |
| JP | 2004-118243 A | 4/2004 |
| JP | 2006163841 A | 6/2006 |
| JP | 2007-280362 A | 10/2007 |

* cited by examiner

*Primary Examiner* — Houshang Safaipour
(74) *Attorney, Agent, or Firm* — Canon USA Inc IP Division

(57) ABSTRACT

A page image is acquired. Area information that includes information on existence or absence of a text area and a picture area is extracted from the acquired page image. The page image is divided into a plurality of blocks. An image feature amount of each of the divided blocks is calculated. Whether the page image includes a picture area is determined on the basis of the extracted area information and the calculated image feature amounts of the blocks.

13 Claims, 18 Drawing Sheets

| 1 | 2 | 3 | 4 | 5 | 6 | 7 | 8 | 9 |
|---|---|---|---|---|---|---|---|---|
| 10 | 11 | 12 | 13 | 14 | 15 | 16 | 17 | 18 |
| 19 | 20 | 21 | 22 | 23 | 24 | 25 | 26 | 27 |
| 28 | 29 | 30 | 31 | 32 | 33 | 34 | 35 | 36 |
| 37 | 38 | 39 | 40 | 41 | 42 | 43 | 44 | 45 |
| 46 | 47 | 48 | 49 | 50 | 51 | 52 | 53 | 54 |
| 55 | 56 | 57 | 58 | 59 | 60 | 61 | 62 | 63 |
| 64 | 65 | 66 | 67 | 68 | 69 | 70 | 71 | 72 |
| 73 | 74 | 75 | 76 | 77 | 78 | 79 | 80 | 81 |

FIG. 10

| LUMINANCE VALUE | 0-31 | 32-63 | 64-95 | 96-127 | 128-159 | 160-191 | 192-223 | 224-255 |
|---|---|---|---|---|---|---|---|---|
| LUMINANCE LABEL VALUE | 0 | 1 | 2 | 3 | 4 | 5 | 6 | 7 |

FIG. 12

| 0 DEGREE | | |
|---|---|---|
| 1 | 1 | -1 |
| 1 | -2 | -1 |
| 1 | 1 | -1 |

| 45 DEGREES | | |
|---|---|---|
| 1 | -1 | -1 |
| 1 | -2 | -1 |
| 1 | 1 | 1 |

| 90 DEGREES | | |
|---|---|---|
| -1 | -1 | -1 |
| 1 | -2 | 1 |
| 1 | 1 | 1 |

| 135 DEGREES | | |
|---|---|---|
| -1 | -1 | 1 |
| -1 | -2 | 1 |
| 1 | 1 | 1 |

| 180 DEGREES | | |
|---|---|---|
| -1 | 1 | 1 |
| -1 | -2 | 1 |
| -1 | 1 | 1 |

| 225 DEGREES | | |
|---|---|---|
| 1 | 1 | 1 |
| -1 | -2 | 1 |
| -1 | -1 | 1 |

| 270 DEGREES | | |
|---|---|---|
| 1 | 1 | 1 |
| 1 | -2 | 1 |
| -1 | -1 | -1 |

| 315 DEGREES | | |
|---|---|---|
| 1 | 1 | 1 |
| 1 | -2 | -1 |
| 1 | -1 | -1 |

FIG. 14

| IMAGE ID | IMAGE |
|---|---|
| 00000001 | 00000001.jpg |
| 00000002 | 00000004.jpg |
| 00000003 | 00000005.jpg |
| 00000004 | 00000012.jpg |

FIG. 15

| IMAGE ID | IMAGE FEATURE AMOUNT | | |
|---|---|---|---|
| | COLOR FEATURE AMOUNT | LUMINANCE FEATURE AMOUNT | EDGE FEATURE AMOUNT |
| 00000001 | ・・・・・ | ・・・・・ | ・・・・・ |
| 00000002 | ・・・・・ | ・・・・・ | ・・・・・ |
| 00000003 | — | ・・・・・ | ・・・・・ |
| 00000004 | — | ・・・・・ | ・・・・・ |
| 00000005 | ・・・・・ | ・・・・・ | ・・・・・ |

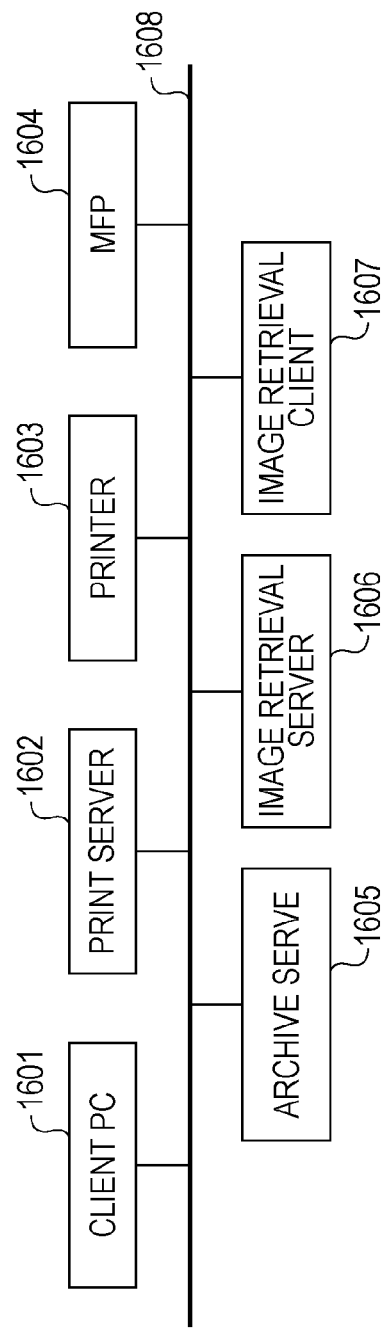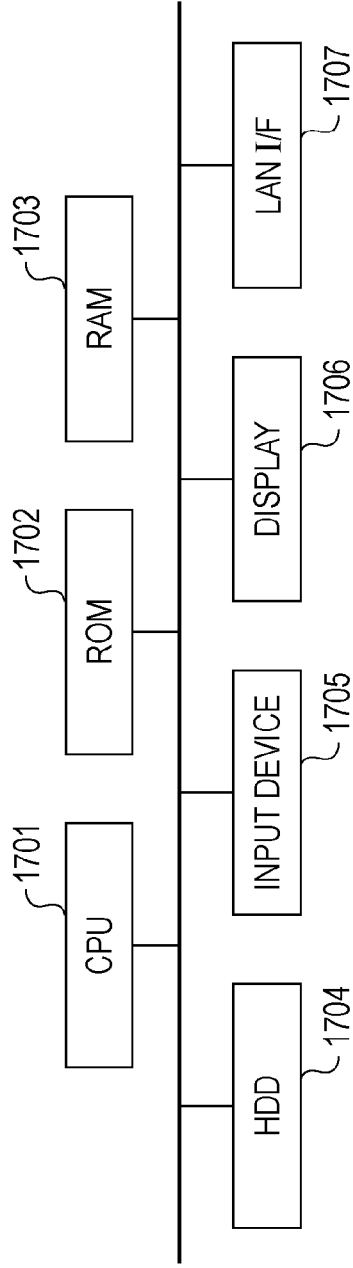

FIG. 20

| JOB TYPE | PRINT |
|---|---|
| JOB NAME | CONFIDENTIAL_DOCUMENT.doc |
| JOB START DATE | 12/01/2007 |
| JOB START DATE/TIME | 12/01/2007 11:22:33 |
| PRINT EXECUTION MODULE NAME | WINWORD.EXE |
| COMPUTER NAME | PC001 |
| IP ADDRESS (CLIENT) | 192.168.1.36 |
| MAC ADDRESS | 00-0A-BC-DE-F0-12 |
| USER NAME (CLIENT) | SUZUKI |
| NUMBER OF COLOR BITS | 24-BIT COLOR |
| PRINTER NAME | LBP5900 LIPS |
| PORT NAME | IP_192.168.1.10 |
| LOCATION | S WING 12F |

IMAGE PROCESSING APPARATUS AND IMAGE PROCESSING METHOD

BACKGROUND OF THE INVENTION

1. Field of the Invention

The present invention relates to an image processing apparatus and an image processing method.

2. Description of the Related Art

With the widespread use of digital image processing apparatuses, anyone can easily copy and transmit original images and print digital documents. However, information leakage through copying, transmission, and printing of confidential information is considered problematic. As measures for this problem, Japanese Patent Laid-Open No. 2004-118243 discloses an image processing apparatus that stores a history of a user and time of copying, transmission, and printing operations in a storage device. With such a configuration, an administrator can track a leakage source by performing a search of the history using the time, the user, and text included in the leaked information.

Japanese Patent Laid-Open No. 2007-280362 discloses an image processing apparatus capable of tracking a leakage source by searching for an image similar to a leaked image from history information stored in association with image feature amounts of original images. Here, the image feature amounts are calculated from pixel values of images. The pixel values indicate luminance and color (RGB) values.

Documents handled in offices include pages only including text, blank pages, pages including text and a picture, such as a photo, a figure, and a graph, and pages only including a picture. When similar image retrieval is performed based on an image of a whole page of a document, an image feature amount calculated from a page only including text is greatly affected by a background color. For example, if image feature amounts of pages only including text are compared, similarity of page images having similar background colors increases. Accordingly, the comparison result has to be eventually checked by people. As a result, retrieval based on the image feature amounts is not much effective for pages only including text. In addition, image retrieval on blank pages is not necessary in the first place. Thus, retrieval based on image feature amounts is only effective for pages including text and a picture and pages only including a picture, namely, pages including at least a picture.

For the reasons described above, expansion of a database can be suppressed and high-speed retrieval can be realized by registering only pages including at least a picture.

A document page analyzing technique is available as a technique for discriminating pages including at least a picture from pages not including a picture. For example, U.S. Pat. No. 5,680,478 discloses a method for binarizing a page image, extracting blocks of black pixels and blocks of white pixels, and extracting areas, such as characters, pictures, figures, tables, frames, and lines, on the basis of the shape, size, and gathering state thereof. It can be determined that whether each page image includes a picture or not using this method.

Generally, document page image analysis focuses on accurate extraction of text. Accordingly, reliability regarding extraction of text is high. However, pictures are sometimes not extracted in the document page image analysis.

SUMMARY OF THE INVENTION

According to one aspect of the present invention, an image processing apparatus is provided that includes an acquiring unit configured to acquire a page image, an extracting unit configured to extract area information, which includes information on existence or absence of a text area and a picture area, from the page image acquired by the acquiring unit, a calculating unit configured to divide the page image into a plurality of blocks and calculate an image feature amount of each of the divided blocks, and a determining unit configured to determine, on the basis of the area information extracted by the extracting unit and the image feature amount of each of the divided blocks calculated by the calculating unit, whether the page image includes the picture area.

According to another aspect of the present invention, an image processing method is provided that includes acquiring a page image, extracting area information, which includes information on existence or absence of a text area and a picture area, from the acquired page image, dividing the page image into a plurality of blocks and calculating an image feature amount of each of the divided blocks, and determining, on the basis of the extracted area information and the calculated image feature amount of each of the divided blocks, whether the page image includes the picture area.

Further features of the present invention will become apparent from the following detailed description of exemplary embodiments with reference to the attached drawings.

BRIEF DESCRIPTION OF THE DRAWINGS

FIG. 10 is a diagram showing an example of a table for use in conversion of a luminance value into a luminance label value.

FIG. 12 is a diagram showing examples of the Prewitt filter.

FIG. 14 is a diagram showing an example of image information including an image ID and an image name.

FIG. 15 is a diagram showing an example of image information including an image ID and image feature amounts.

FIGS. 16A and 16B are diagrams showing an example of a job history management system and an example of a client PC 1601, respectively.

FIG. 20 is a diagram showing an example of job log information included in job tracking information shown in FIG. 19.

DESCRIPTION OF THE EMBODIMENTS (Control Configuration of Image Processing Apparatus)

Figure 1:
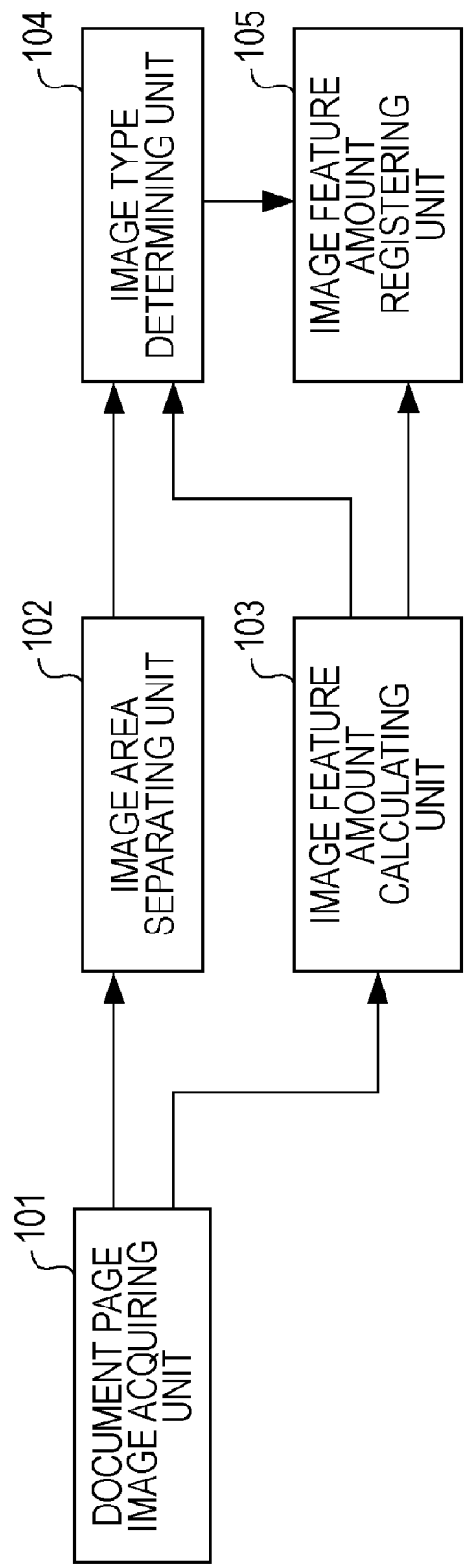
FIG. 1 is a diagram showing a functional configuration of an image processing apparatus.

FIG. 1 is a diagram showing an example of a functional configuration of an image processing apparatus.

A document page image acquiring unit 101 acquires page images stored in a storage device, such as a hard disk drive (HDD), of the image processing apparatus, page images scanned by an image scanning apparatus, image data converted from print data transmitted to a print server or a printing apparatus.

An image area separating unit 102 analyzes the page image acquired by the document page image acquiring unit 101, divides the page image into a picture area, a text area, and so forth, and acquires area information including coordinate information of each area.

An image feature amount calculating unit 103 divides the page image into a plurality of mesh blocks and calculates an image feature amount of each mesh block.

An image type determining unit 104 determines whether the page image includes a picture using the area information as an image feature amount.

An image feature amount registering unit 105 registers the page image determined to include a picture by the image type determining unit 104 in association with the image feature amount of the page image.

A hardware configuration of the image processing apparatus may be similar to that of an image retrieval server or a multifunction peripheral (MFP) according to an exemplary embodiment to be described later. A central processing unit (CPU) of the image processing apparatus executes processing on the basis of programs stored in a read-only memory (ROM) or an HDD of the image processing apparatus, thereby realizing functional blocks shown in FIG. 1.

(Overview of Image Processing)

Figure 2:
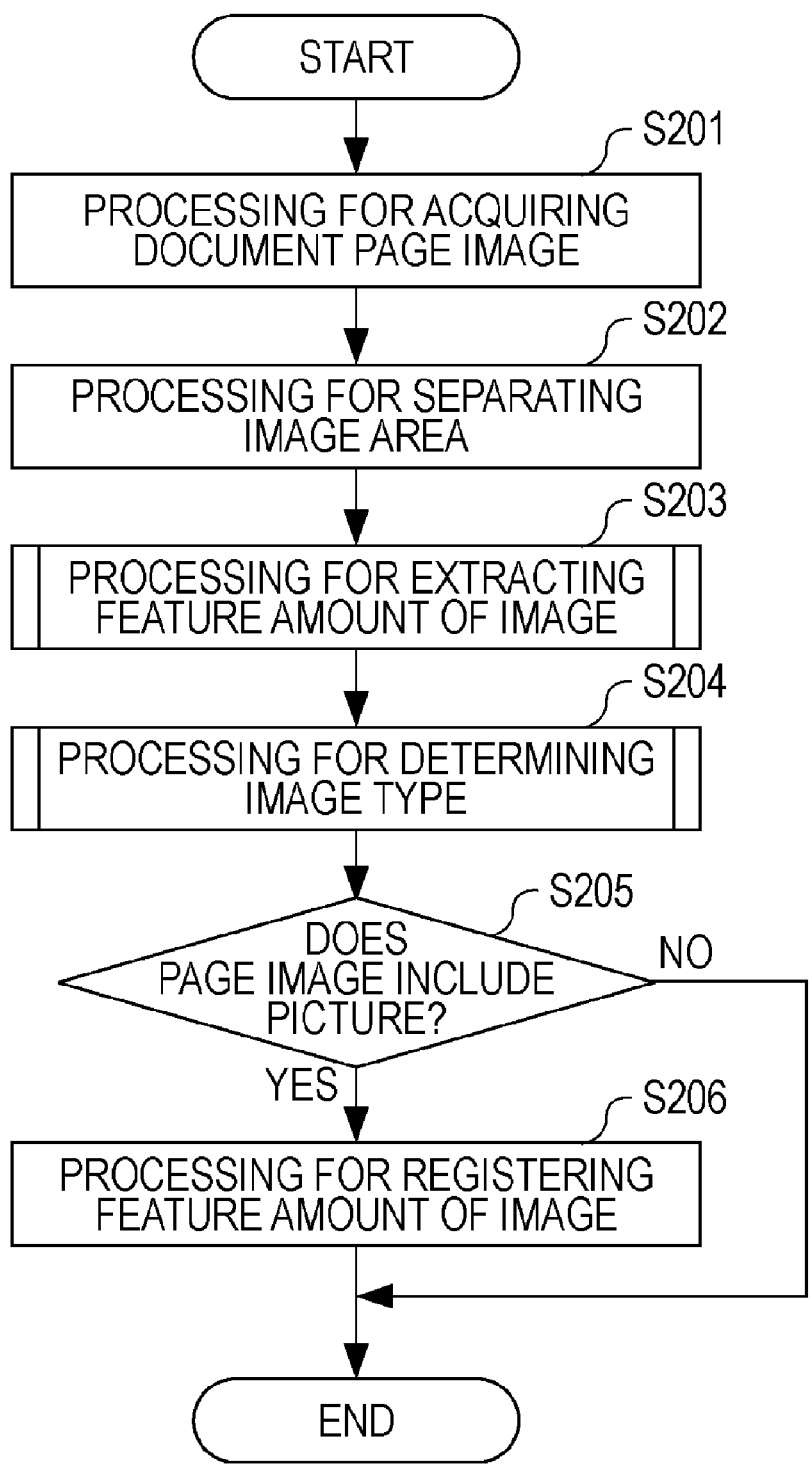
FIG. 2 is a flowchart showing image processing performed by an image processing apparatus.

FIG. 2 is a flowchart showing an example of image processing performed by the image processing apparatus.

At STEP S201, the document page image acquiring unit 101 acquires a page image from a document.

At STEP S202, the image area separating unit 102 analyzes the page image acquired at STEP S201, divides the page image into areas having specific attributes (for example, a picture area, a text area, and so forth), and acquires coordinate information of each divided area. In this exemplary embodiment, figures, photos, and tables are defined as the picture area. However, the definition is not limited to this particular example and image retrieval targets may be defined as the picture area. For example, the image area separating unit 102 may categorize a table area as the text area or a line area as the picture area.

At STEP S203, the image feature amount calculating unit 103 divides the page image into a plurality of mesh blocks and calculates an image feature amount of each block.

At STEP S204, the image type determining unit 104 determines whether the page image includes a picture using the information on the picture area and the text area extracted at STEP S202 and the image feature amount calculated at STEP S203.

If the image type determining unit 104 determines that the target page image includes a picture at STEP S205, the process proceeds to STEP S206. On the other hand, if the image type determining unit 104 determines that the target image page does not include a picture at STEP S205, the process shown in FIG. 2 terminates.

At STEP S206, the image feature amount registering unit 105 stores the image feature amount calculated at STEP S203 in a storage device, such as an HDD and a RAM, of the image processing apparatus in association with the page image.

(Image Area Separating Processing)

Figure 3:
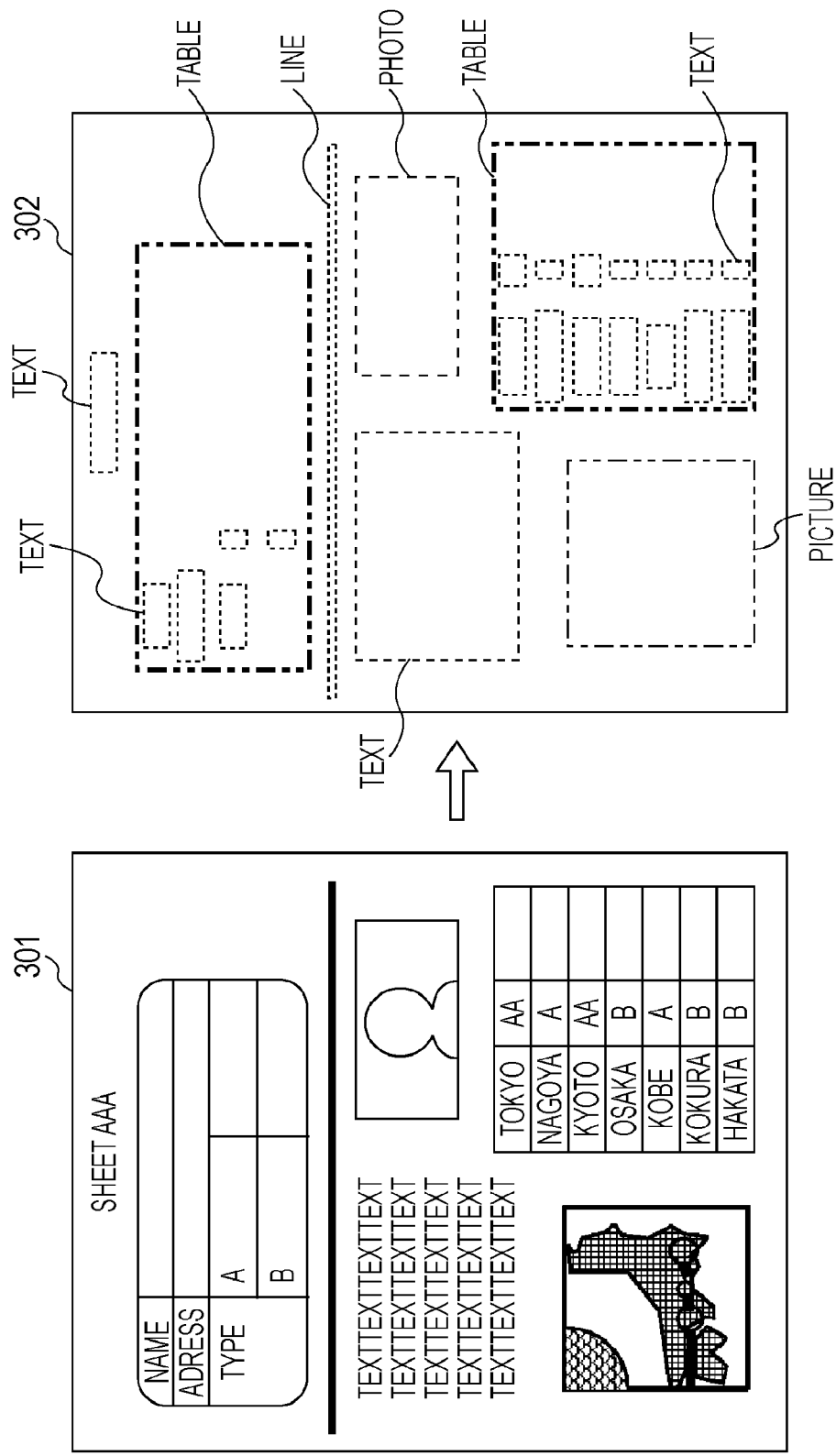
FIG. 3 is a diagram showing a detail of image area separating processing.

FIG. 3 is a schematic diagram of image area separating processing carried out at STEP S202.

The image area separating unit 102 recognizes an image 301 shown in FIG. 3 as meaningful areas shown in a page 302. For example, the image area separating unit 102 determines whether an attribute of each area is text, a figure, a photo, a line, or a table, to divide the page 302 into areas having different attributes.

Although an expression that the page 302 is divided into a plurality of areas is used for ease of explanation, information indicating a position of each area of the image 301 is acquired here.

An example of image area separating processing will now be described in detail.

First, the image area separating unit 102 binarizes an input image into a black-and-white image and performs edge following to extract blocks of pixels surrounded by black pixels. The image area separating unit 102 then performs processing for following an edge of white pixels existing within the black pixel block that is larger than a predetermined size to extract blocks of white pixels. Furthermore, the image area separating unit 102 recursively extracts blocks of black pixels from the extracted white pixel block that is equal to or larger than a predetermined size.

The image area separating unit 102 categorizes the black pixel blocks acquired in this manner on the basis of the size and shape thereof to categorize attributes thereof. For example, if an aspect ratio of a black pixel block is close to 1 and the size thereof is within a predetermined range, the block is determined as a pixel block of a character. In addition, pixels blocks corresponding to neighboring characters are collectively determined as the text area. Regarding pixel blocks other than the character area, the image area separating unit 102 determines a homogeneous pixel block as a line area, and determines an area including arranged rectangular white pixel blocks, which are equal to or larger than a predetermined size, surrounded by black pixel blocks as a table area. Furthermore, the image area separating unit 102 determines an area including scattered irregular pixel blocks as a photo area and determines other pixel blocks having given shapes as figure areas.

(Detail of Image Feature Amount Extracting Processing)

Figure 4:
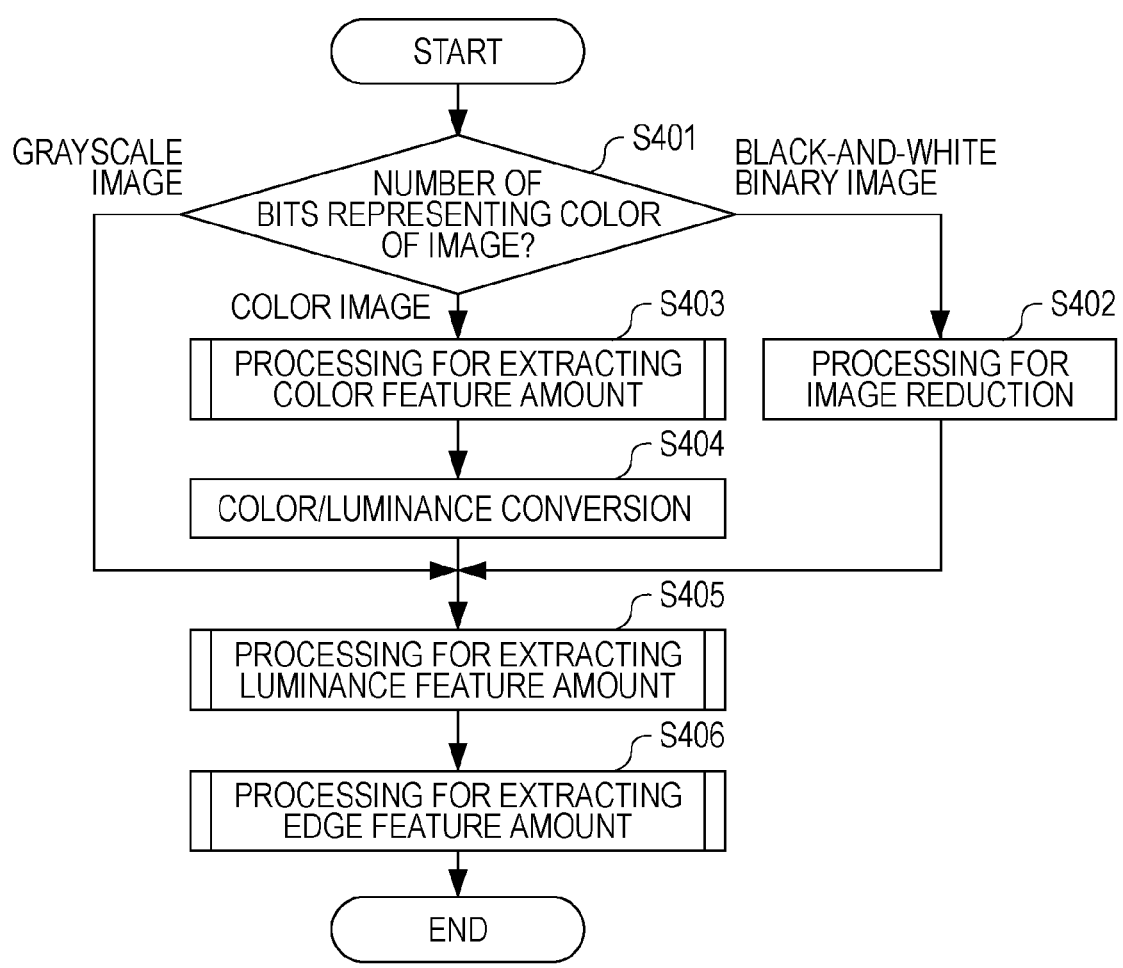
FIG. 4 is a flowchart showing a detail of image feature amount extracting processing.

The image feature amount extracting processing carried out at STEP S203 will be described in detail with reference to FIG. 4. FIG. 4 is a flowchart showing processing for extracting image feature amounts.

The image feature amount calculating unit 103 extracts, as image feature amounts, an image feature amount regarding colors, such as an RGB color space, an image feature amount regarding luminance, and an image feature amount regarding edges.

At STEP S401, the image feature amount calculating unit 103 determines the number of bits representing the color of a processing-target image (e.g., 256-bit color, 16-bit color, or 32-bit color). If the processing-target image is a color image, the process proceeds to STEP S403. If the processing-target image is a grayscale image, the process proceeds to STEP S405. If the processing-target image is a black-and-white binary image, the process proceeds to STEP S402.

If the processing-target image is a black-and-white binary image, the image feature amount calculating unit 103 converts the black-and-white image into a grayscale image through reduction processing at STEP S402. The image feature amount calculating unit 103 then performs the same processing as that is performed when the processing-target image is a grayscale image.

The processing-target image is a color image, the image feature amount calculating unit 103 extracts a color feature amount at STEP S403.

Since the luminance feature amount and the edge feature amount are extracted using luminance images, the image feature amount calculating unit 103 converts the color image into a luminance image at STEP S404. The image feature amount calculating unit 103 uses the following equation to converts the color image into the luminance image.

$$Y = 0.299 \times R + 0.587 \times G + 0.114 \times B$$

Here, Y represents a luminance value, whereas R, G, and B represent red, green, and blue values of the color image, respectively.

At STEP S405, the image feature amount calculating unit 103 extracts the luminance feature amount.

At STEP S406, the image feature amount calculating unit 103 extracts the edge feature amount.

(Color Feature Amount Extracting Processing)

Figure 5:
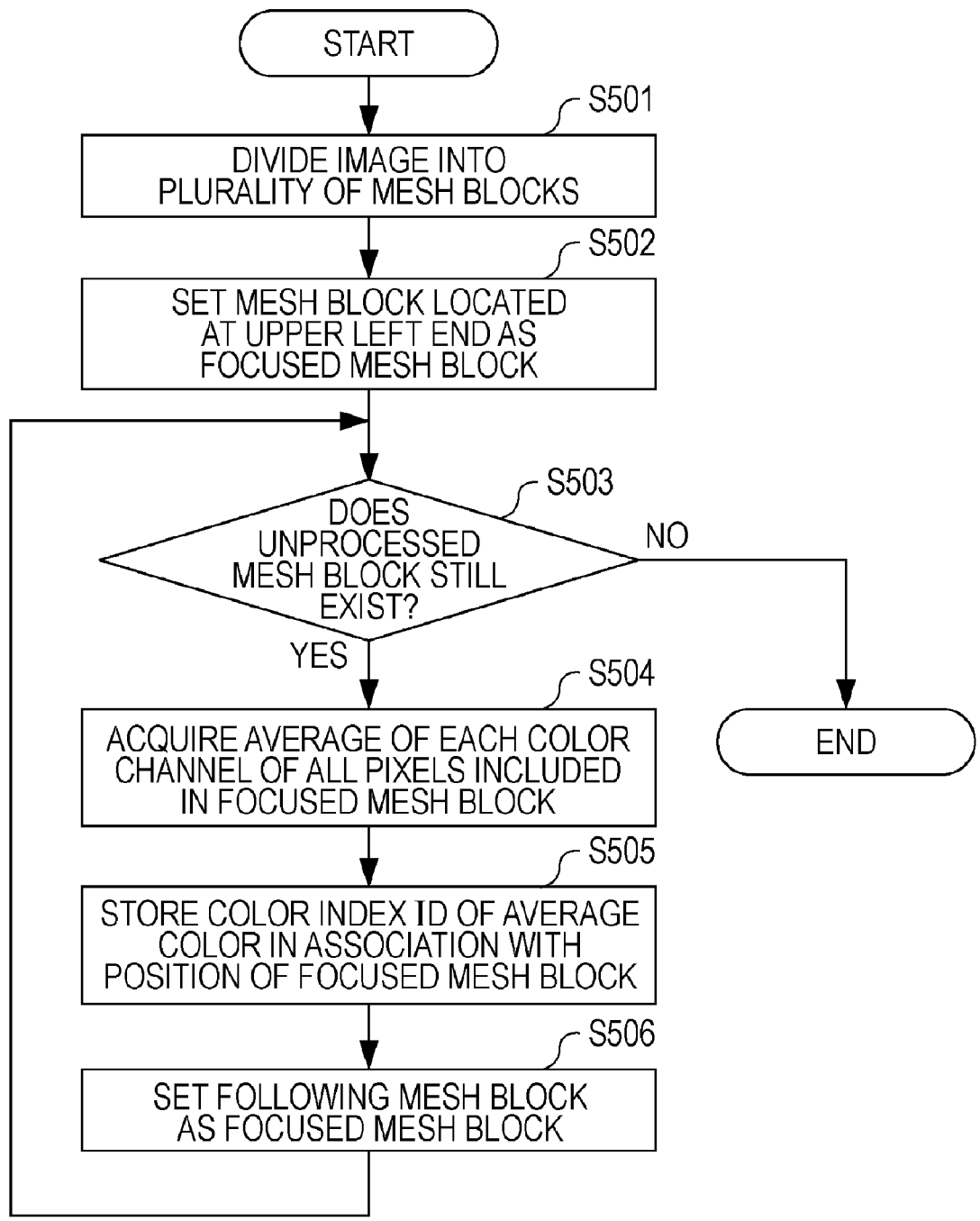
FIG. 5 is a flowchart showing a detail of color feature amount extracting processing.

FIG. 5 is a flowchart showing the color feature amount extracting processing carried out at STEP S403.

Figures 6, 7:
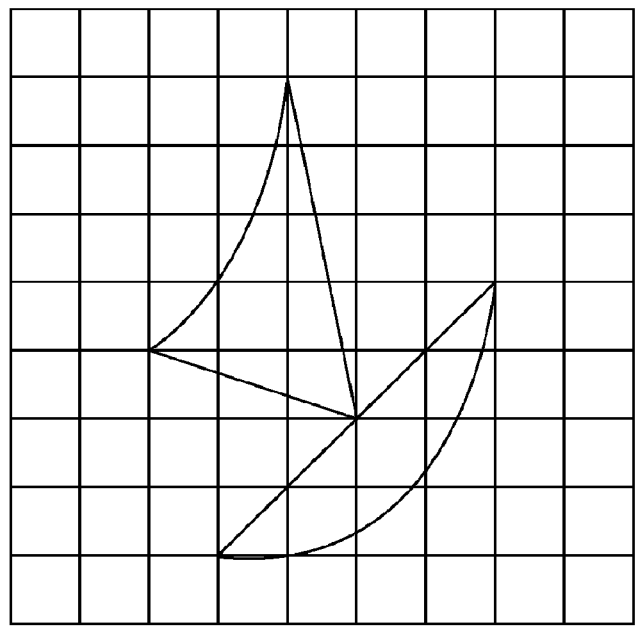
FIG. 6 is a diagram showing an example of division of an image into a plurality of blocks.
FIG. 7 is a diagram showing an example of an order determination table.

At STEP S501, the image feature amount calculating unit 103 divides an image into a plurality of mesh blocks. For example, as shown in FIG. 6, the image feature amount calculating unit 103 divides a processing-target image into 9×9 mesh blocks. Although the processing-target image is divided into 9×9=81 mesh blocks for ease of explanation in this exemplary embodiment, the processing-target image is divided into 15×15=225 mesh blocks or more in some embodiments.

At STEP S502, the image feature amount calculating unit 103 sets a block located at the upper left end as a focused mesh block, which is processed next. The order of this focused mesh block is set with reference to an order determination table, which defines a processing order as shown in FIG. 7. FIG. 7 shows an example of the order determination table. In the example shown in FIG. 7, the mesh blocks are first scanned from the upper left end to the right. After completion of processing of the block located at the right end, the scanning is continued from a block at the left end of the next line to the right.

At STEP S503, the image feature amount calculating unit 103 determines whether an unprocessed focused mesh block still exists. If the unprocessed focused mesh block does not exist (NO at STEP S503), the image feature amount calculating unit 103 terminates the process. On the other hand, if the unprocessed focused mesh block exists (YES at STEP S503), the process proceeds to STEP S504. At STEP S504, the image feature amount calculating unit 103 acquires an average of each color channel of all pixels included in the focused mesh block. For example, in the case of the RGB color space, averages of R, G, and B channels are acquired.

Figure 8:
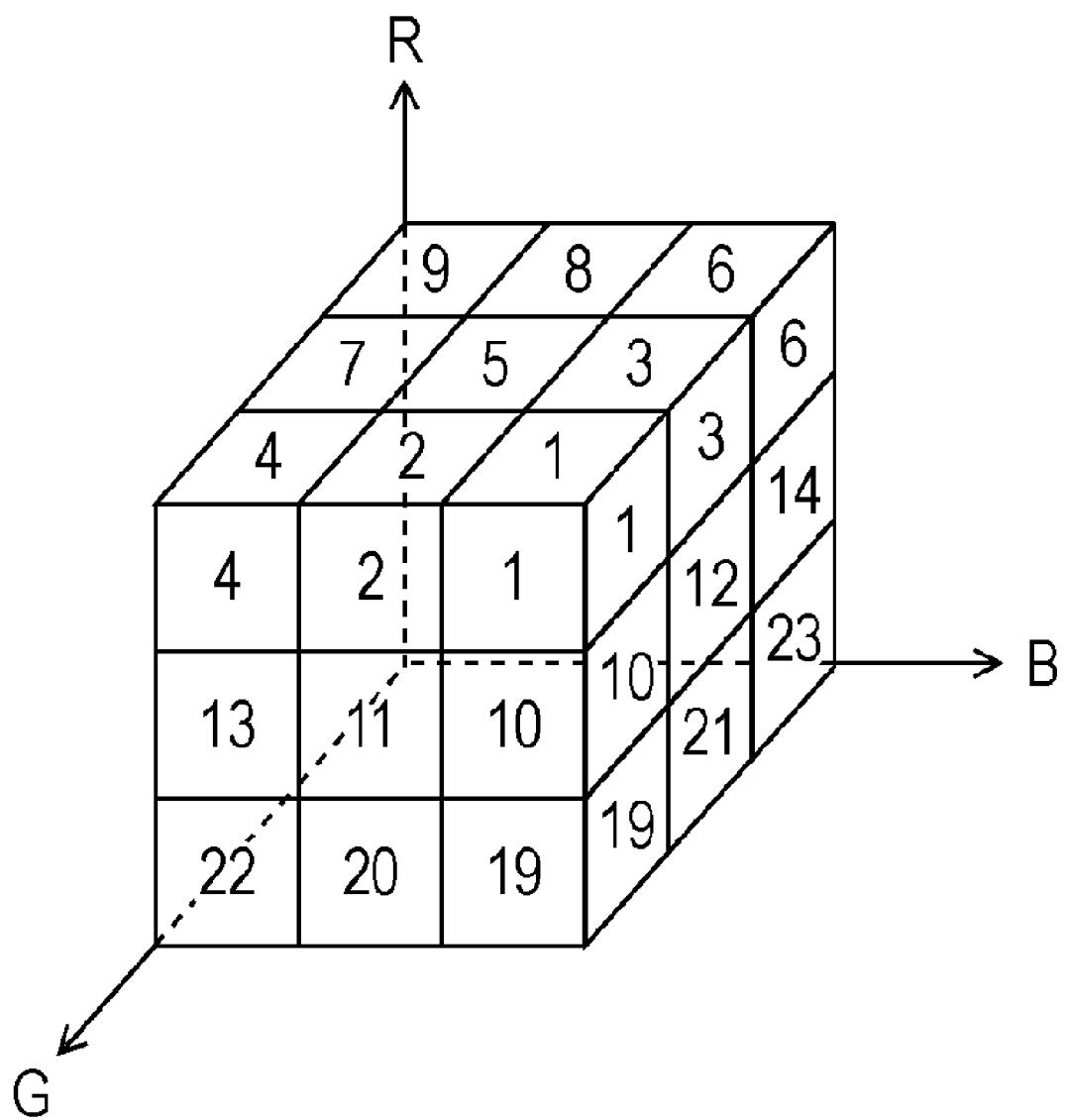
FIG. 8 is a diagram showing an example of a configuration of color bins in a color space.

At STEP S505, the image feature amount calculating unit 103 projects the averages acquired at STEP S504 onto a color bin (color index), which is a subspace created by dividing a color space as shown in FIG. 8, to acquire an ID of the color bin. FIG. 8 shows an example where the RGB color space is divided into 3×3×3=27 blocks. In some embodiments, the RGB color space is divided into approximately 6×6×6=216. The image feature amount calculating unit 103 determines the acquired color bin ID as a color representing the focused mesh block. The image feature amount calculating unit 103 then stores the position of the focused mesh block (position information) in association with the color bin ID.

At STEP S506, the image feature amount calculating unit 103 sets the next processing-target focused mesh block with reference to the order determination table shown in FIG. 7.

(Luminance Feature Amount Extracting Processing)

Figure 9:
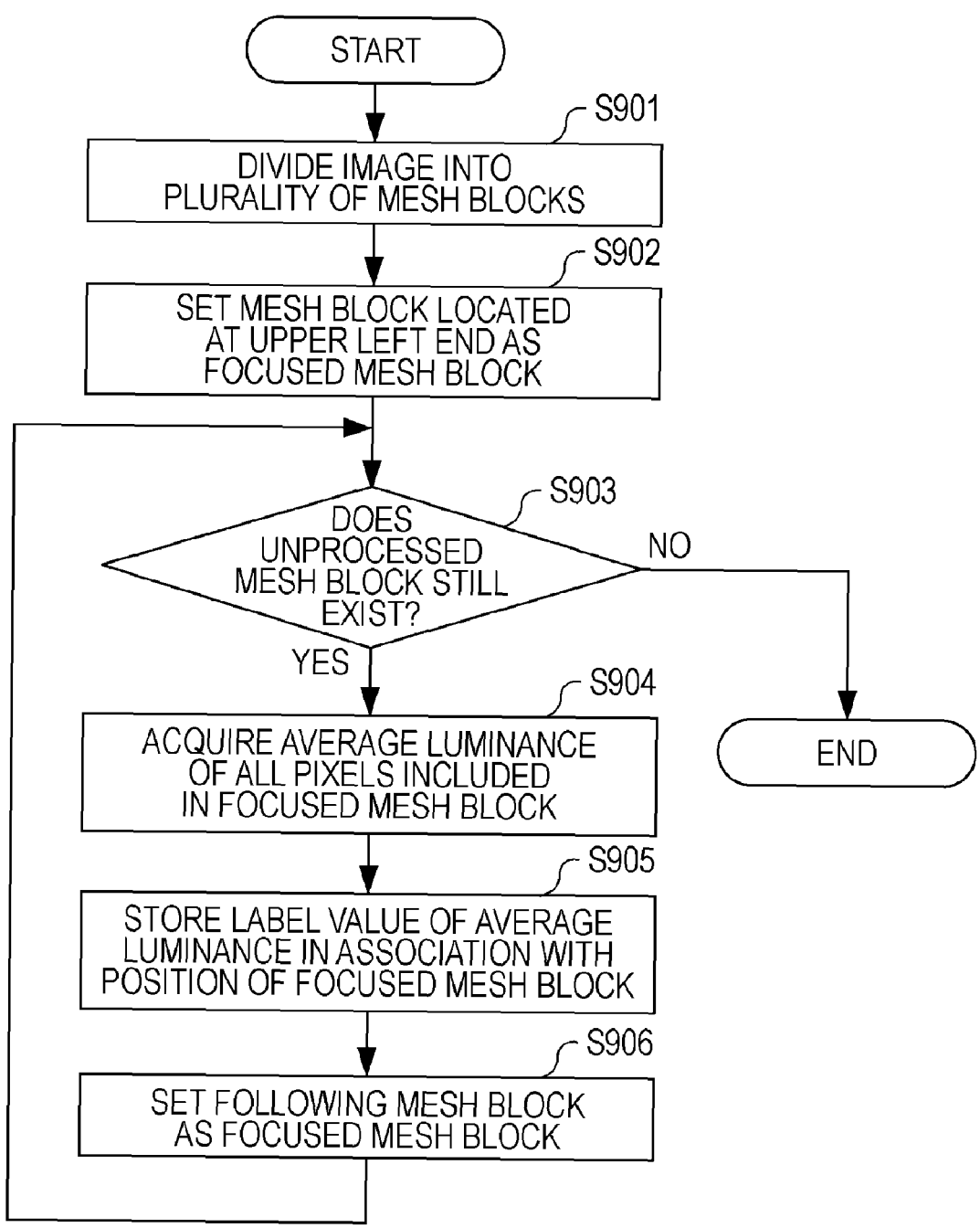
FIG. 9 is a flowchart showing a detail of luminance feature amount extracting processing.

FIG. 9 is a flowchart showing the luminance feature amount extracting processing carried out at STEP S405.

Since processing performed at STEPs S901-S904 and S906 are similar to STEPs S501-S504 and S506 described with reference to FIG. 5, a description thereof is omitted.

At STEP S905, the image feature amount calculating unit 103 quantizes an average luminance value of each mash block acquired at STEP S904 into a luminance label value using a quantization table shown in FIG. 10. Although 8-bit luminance value is quantized into eight steps in this exemplary embodiment, the number of quantization steps is not limited to this particular example. For example, the luminance value may be quantized into 16 steps or 32 steps. The image feature amount calculating unit 103 then stores the acquired luminance label value in association with the position of the focused mesh block (position information).

Through the above-described processing, the image feature amount calculating unit 103 can extract, as the luminance feature amount, associated information of the representative luminance value of each mesh block of the processing-target image and the position information of the mesh block.

(Edge Feature Amount Extracting Processing)

Figure 11:
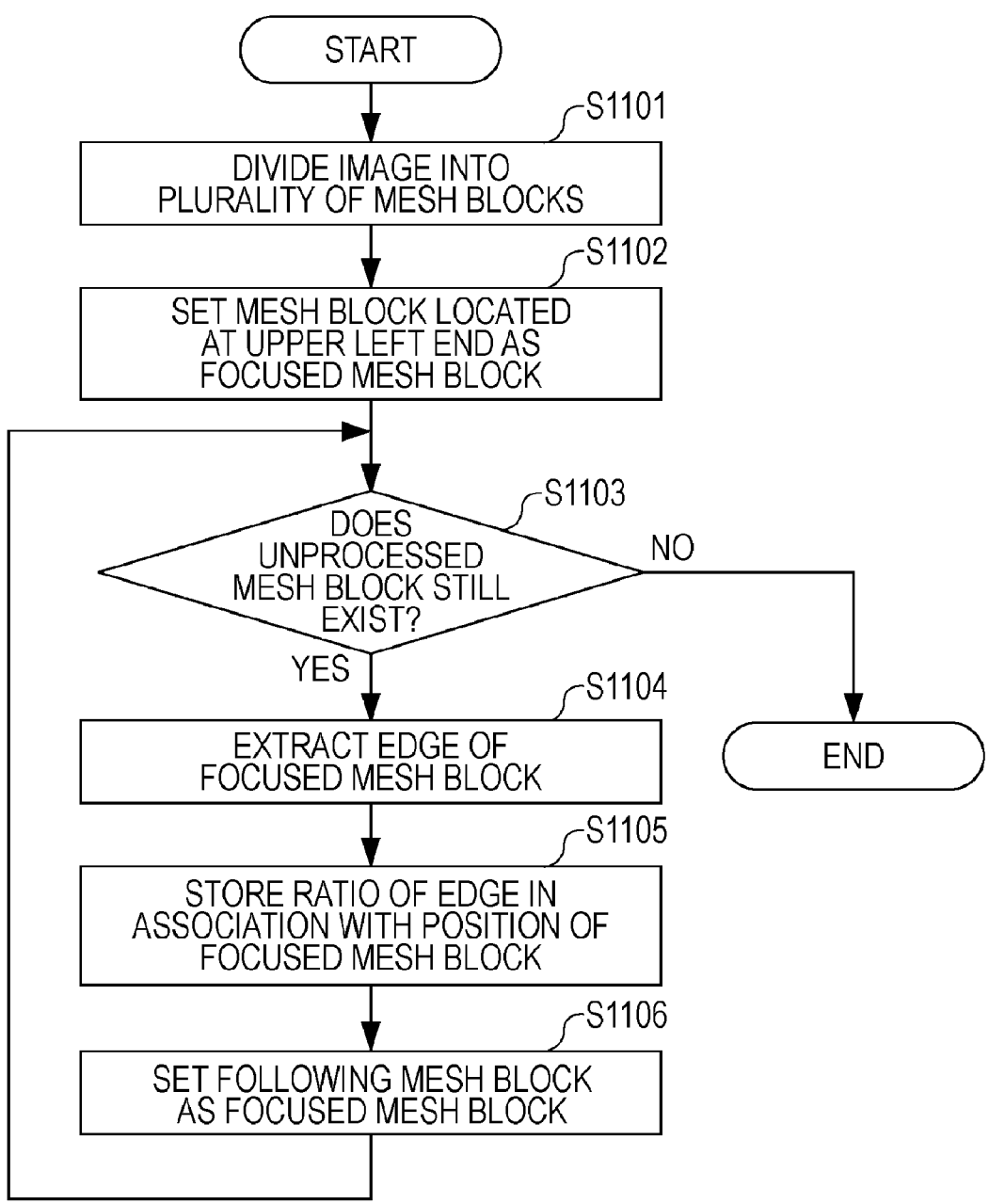
FIG. 11 is a flowchart for describing a detail of edge feature amount extracting processing.

FIG. 11 is a flowchart showing the edge feature amount extracting processing carried out at STEP S406.

Since processing performed at STEPs S1101-S1103 and S1106 are similar to STEPs S501-S503 and S506 described with reference to FIG. 5, a description thereof is omitted.

At STEP S1104, the image feature amount calculating unit 103 acquires an edge in a focused mesh block. As an edge extracting method, a method for performing calculation, using a differentiation filter, on a range including each pixel and surrounding pixels thereof is available. As the differentiation filter, the Prewitt filer, the Sobel filter, the Robinson filter, and the Kirish filter can be used. Here, an example of performing calculation using the Prewitt filter (FIG. 12) is shown. FIG. 12 is a diagram showing examples of the Prewitt filter.

The image feature amount calculating unit 103 multiples a value of each of a focused pixel and eight pixels surrounding the focused pixel by the value of the Prewitt filter and determines a sum of the products, thereby determines the edge strength of each direction. The image feature amount calculating unit 103 determines the highest edge strength in the eight directions as the edge strength of the focused pixel. However, if the edge strength is lower than a predetermined threshold, the image feature amount calculating unit 103 determines that the focused mesh block does not include any edge.

At STEP S1105, the image feature amount calculating unit 103 determines a ratio of pixels of the edge to all pixels included in the mesh block. At this time, when the edge exists all over the pixels, the ratio is equal to 1. The image feature amount calculating unit 103 then sets the acquired edge ratio as the edge ratio of the focused mesh block, and stores the edge ratio in association with the position of the mesh block (position information).

Through the above-described processing, the image feature amount calculating unit 103 can extract, as the edge feature amount, associated information of the edge ratio of each mesh block of a processing-target image and the position information of the mesh block.

(Image Type Determining Processing)

Figure 13:
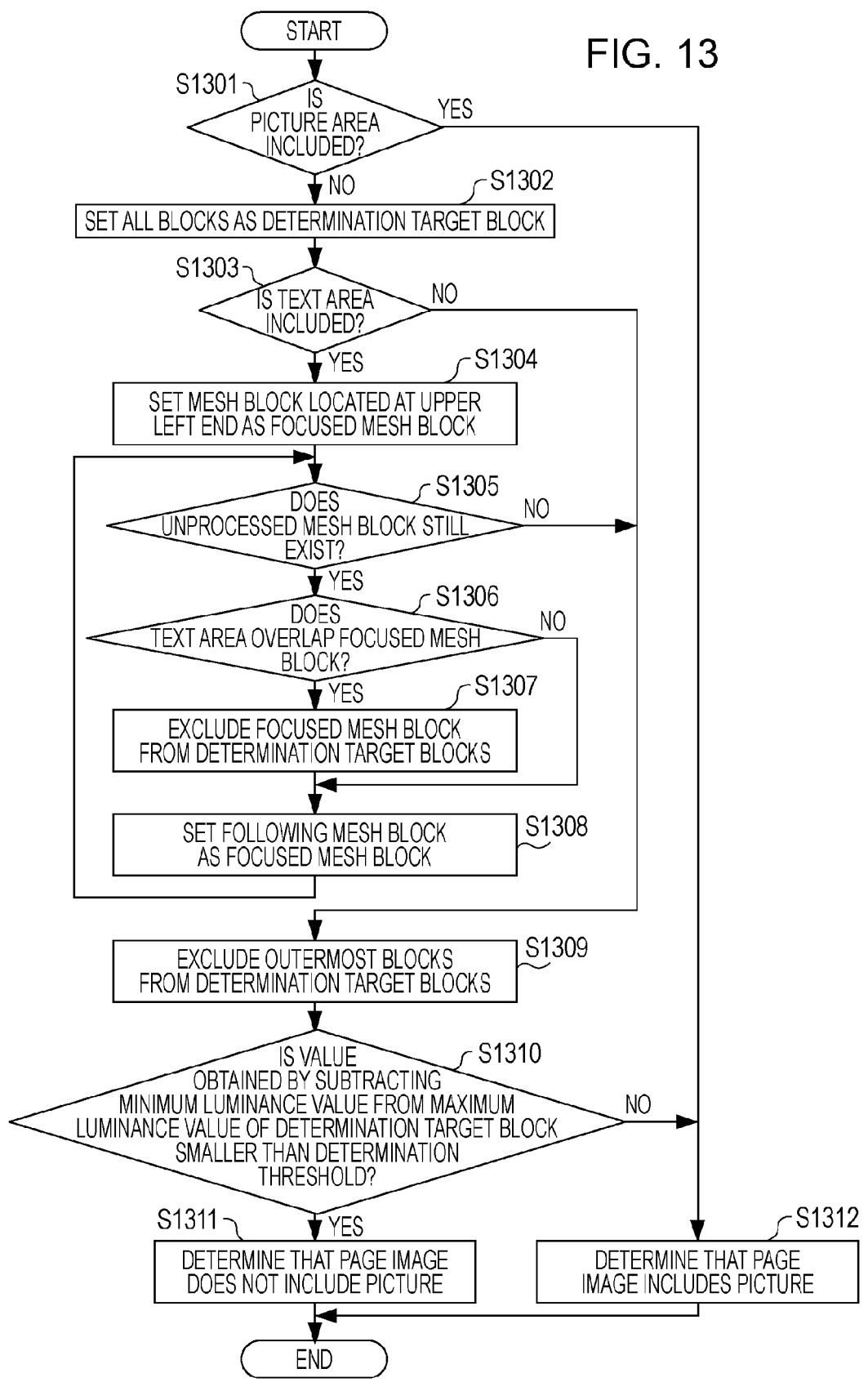
FIG. 13 is a flowchart showing a detail of image type determining processing.

The image type determining processing will be described in detail with reference to FIG. 13. FIG. 13 is a flowchart showing the image type determining processing carried out at STEP S204. Since processing performed at STEPs S1304, S1305, and S1308 are similar to STEPs S502, S503, and S506 described with reference to FIG. 5, a description thereof is omitted.

If it is determined that a page image includes a picture area at STEP S1301 as a result of image separation carried out at STEP S202, the process terminates. If the picture area is not included, the process proceeds to STEP S1302.

At STEP S1302, the image type determining unit 104 sets all blocks used in extraction of the luminance feature amount as targets of determination of whether a page image includes a picture or not.

If it is determined that a text area is not included at STEP S1303 as a result of image separation carried out at STEP S202, the process proceeds to STEP S1309. If the text area is included, the process proceeds to STEP S1304.

At STEP S1306, the image type determining unit 104 determines whether the text area overlaps the focused mesh block. If the text area does not overlap, the process proceeds to STEP S1308. If the text area overlaps, the process proceeds to STEP S1307. At STEP S1307, the image type determining unit 104 excludes the text-area-overlapping focused mesh block from the determination-target blocks. The process then proceeds to STEP S1308.

At STEP S1309, the image type determining unit 104 excludes outermost mesh blocks (blocks from 1 to 9, from 73 to 81, from 10 to 64, from 18 to 72 in FIG. 7) from the determination-target blocks to suppress a decrease in determination accuracy due to the shade of a paper document formed at ends of an image scanned by an image scanning apparatus. The image type determining unit 104 may perform this processing only on images scanned by an image scanning apparatus.

At STEP S1310, the image type determining unit 104 determines whether the page image includes a picture using the luminance value of the determination-target block. More specifically, the image type determining unit 104 calculates a difference between the maximum luminance value (brightest) and the minimum luminance value (darkest) of the determination-target block. If the difference is smaller than a predetermined threshold value, the image type determining unit 104 determines that the page image does not include a picture (STEP S1311). The process then terminates. On the other hand, if the difference is not smaller than the predetermined threshold value, the image type determining unit 104 determines that the page image includes a picture (STEP S1312). The process then terminates. Since the luminance value of a block including a picture becomes smaller (darker) and the luminance value of a block not including a picture becomes larger (brighter), the image type determining unit 104 can determine whether a picture exists through the above-described processing.

In addition to the above-described method for determining whether a picture exists or not, the image type determining unit 104 may determine whether the page image includes a picture using standard deviation of the luminance values. Since blocks having small luminance values and blocks having large luminance values coexist when a picture is included, the standard deviation thereof becomes larger. Conversely, since only blocks having similar luminance values exist when a picture is not included, the standard deviation thereof becomes smaller. Accordingly, if the standard deviation of the luminance values is smaller than a predetermined threshold, the image type determining unit 104 determines that the page image does not include a picture. If the standard deviation of the luminance values is not smaller than the predetermined threshold, the image type determining unit 104 determines that the page image includes a picture. In addition, the image type determining unit 104 can also use the minimum luminance value or the average luminance value instead of the difference between the maximum luminance value and the minimum luminance value.

(Feature Amount Registering Processing)

A detail of the image feature amount registering processing carried out at STEP S206 will be described.

The image feature amount registering unit 105 assigns a unique image ID to an acquired image, and stores the assigned unique image ID in association with the image. FIG. 14 is a diagram showing an example of image information including the image ID and the image name.

The image feature amount registering unit 105 then stores the image feature amounts for each image in association with the image ID. FIG. 15 is a diagram showing an example of image information including the image ID and the image feature amounts.

FIG. 16A is a diagram showing an example of a job history management system.

Referring to FIG. 16A, the job history management system includes a client personal computer (PC) 1601, a print server 1602, a printer 1603, a multifunction peripheral (MFP) 1604, an archive server 1605, an image retrieval server 1606, and an image retrieval client 1607. A network 1608 is a communication medium for connecting the above-described elements. A local area network (LAN) is used as the network 1608 in this exemplary embodiment.

An application program (hereinafter, referred to as an application) of the client PC 1601 issues a print instruction on the basis of a user operation. The client PC 1601 also transmits job tracking information to the print server 1602 at time of issuance of the print instruction. A function for transmitting the job tracking information to the print server 1602 belongs to a printer driver installed in the client PC 1601. Here, the job tracking information includes an image that is output in the job and job log information. The image output in the job indicates content of a print job output by the printer 1603, which is an example of a job outputting apparatus. The job log information will be described later.

Upon receiving the print instruction transmitted from the client PC 1601, the print server 1602 transmits the print data to the printer 1603 and temporarily stores the job tracking information used at the time of a printing operation by the printer 1603. The print server 1602 then transmits the job tracking information to the archive server 1605. The printer 1603 carries out a printing operation in accordance with the print data transmitted from the print server 1602.

In response to a user operation, the MFP 1604, which is an example of a job outputting apparatus, executes (outputs) a job, such as a copy job, a print job, and a transmission job. The MFP 1604 transmits the tracking information of the executed job to the archive server 1605. The archive server 1605 stores the job tracking information transmitted from the print server 1602 or the MFP 1604.

The image retrieval server 1606 extracts image feature amounts of a page image of a document image included in the job tracking information stored in the archive server 1605. The image retrieval server 1606 then determines whether the extracted page image includes a picture. The image retrieval server 1606 stores the image feature amounts of the page image that is determined to include a picture. Furthermore, the image retrieval server 1606 compares the stored image feature amounts with image feature amounts of a verification-target image to calculate similarity between the retrieval-target image and the verification-target image. The image retrieval client 1607 displays the retrieval result based on the similarity calculated by the image retrieval server 1606 to users.

FIG. 16B is a diagram showing an example of a hardware configuration of the client PC 1601. Since the print server 1602, the archive server 1605, the image retrieval server 1606, and the image retrieval client 1607 have hardware configurations similar to that of the client PC 1601 described below, a description thereof is omitted here.

The client PC 1601 includes a CPU 1701, a ROM 1702, a RAM 1703, an HDD 1704, an input device 1705, a display 1706, and a LAN interface (I/F) 1707.

The CPU 1701 directly or indirectly controls each element connected to each other through an internal bus to execute a program for realizing processing described in this exemplary embodiment. The ROM 1702 stores basic software, such as a basic input/output system (BIOS). The RAM 1703 is utilized as a work area of the CPU 1701 and a temporary storage area for loading the program. The program realizes, for example, a function for embedding a keyword in a digital document, managing an operation authority of a combination of the keyword and user information, or storing the job tracking information.

The HDD 1704 stores the program as a file, for example. The input device 1705 is used by users to perform operations on an operation screen. The display 1706 displays various screens including the operation screen and is used when users check operations. The LAN I/F 1707 serves as an interface for connecting the client PC 1601 to the network (LAN) 1608.

Figure 17A:
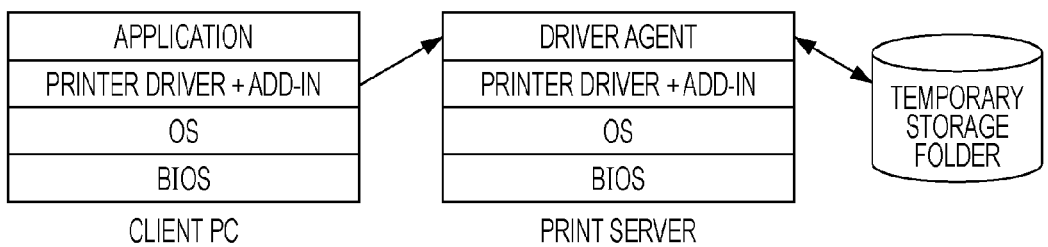
FIGS. 17A, 17B, 17C, 17D, and 17E are diagrams showing an example of a module configuration of software operating in a client PC 1601 and a print server 1602, an example of a module configuration of software operating in an archive server 1605, an example of a module configuration of software operating in an image retrieval server 1606, an example of a module configuration of software operating in an image retrieval client 1607, and an example of a module configuration of software operating in an MFP 1604, respectively.

FIG. 17A is a diagram showing an example of a module configuration of software operating in the client PC 1601 and the print server 1602.

Referring to FIG. 17A, a printer driver for the printer 1603, an add-in module, a driver agent are operating on a platform, such as a BIOS and an OS, of the print server 1602. Similarly, a printer driver for the printer 1603 or the MFP 1604, an add-in module, and an application are operating on a platform, such as a BIOS or an OS, of the client PC 1601. The add-in module is a program module for adding a function for acquiring job tracking information to the printer driver. By applying the add-in module to the printer driver not having the function for acquiring the job tracking information, it is possible to add the function for acquiring the job tracking information.

The driver agent stores the job tracking information supplied from the add-in module in a temporary storage folder as a file. The driver agent also transmits the job tracking information to the archive server 1605.

Figure 17B:
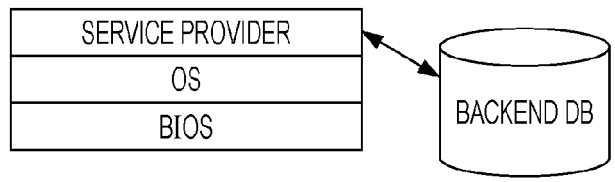

FIG. 17B is a diagram showing an example of a module configuration of software operating in the archive server 1605.

Referring to FIG. 17B, a service provider is operating on a platform, such as a BIOS or an OS, of the archive server 1605. The service provider receives job tracking information transmitted from the driver agent of the print server 1602 or an MFP agent of the MFP 1604, and stores the job tracking information in a backend database (hereinafter, referred to as a backend DB) through a backend server. A document management system and a database can be used in combination as the backend server in accordance with the number of printers and MFPs or the number of jobs to be handled.

Figure 17C:
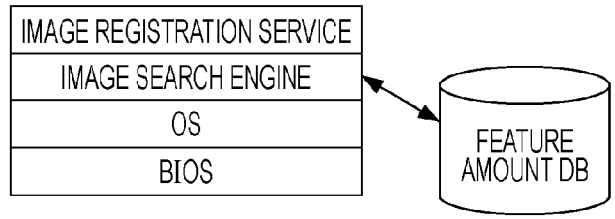

FIG. 17C is a diagram showing an example of a module configuration of software operating in the image retrieval server 1606.

Referring to FIG. 17C, an image search engine is operating based on an image registration service on a platform, such as a BIOS or an OS, of the image retrieval server 1606. Registration of an image indicates a process of extracting feature amounts of an image from a document image indicating job output content stored in the archive server 1605 and registering the feature amounts in a feature amount DB. The image registration service and the image search engine are stored in an HDD, are loaded into the RAM 1703 before execution, and are executed under the control of the CPU.

Figure 17D:
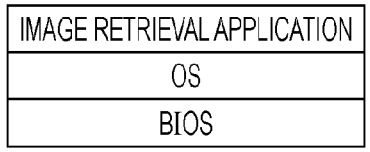

FIG. 17D is a diagram showing an example of a module configuration of software operating in the image retrieval client 1607.

Referring to FIG. 17D, an image retrieval application is operating on a platform, such as a BIOS or an OS, of the image retrieval client 1607. The image retrieval application provides functions for receiving specification of a verification-target image from users and displaying the image retrieval result. Processing for extracting feature amounts of the verification-target image, comparing the feature amounts of the verification-target image with feature amounts of retrieval-target images, and calculating the similarity is performed by the image search engine of the image retrieval server 1606 under control of the image retrieval application.

As a method for specifying a creation condition of a verification-target image, users may input a scanned image or a digital data, or 24-bit color or 8-bit grayscale through a user interface of the image retrieval application. The image retrieval application is stored in an HDD, is loaded into a RAM before execution, and is executed under control of a CPU.

Figure 18:
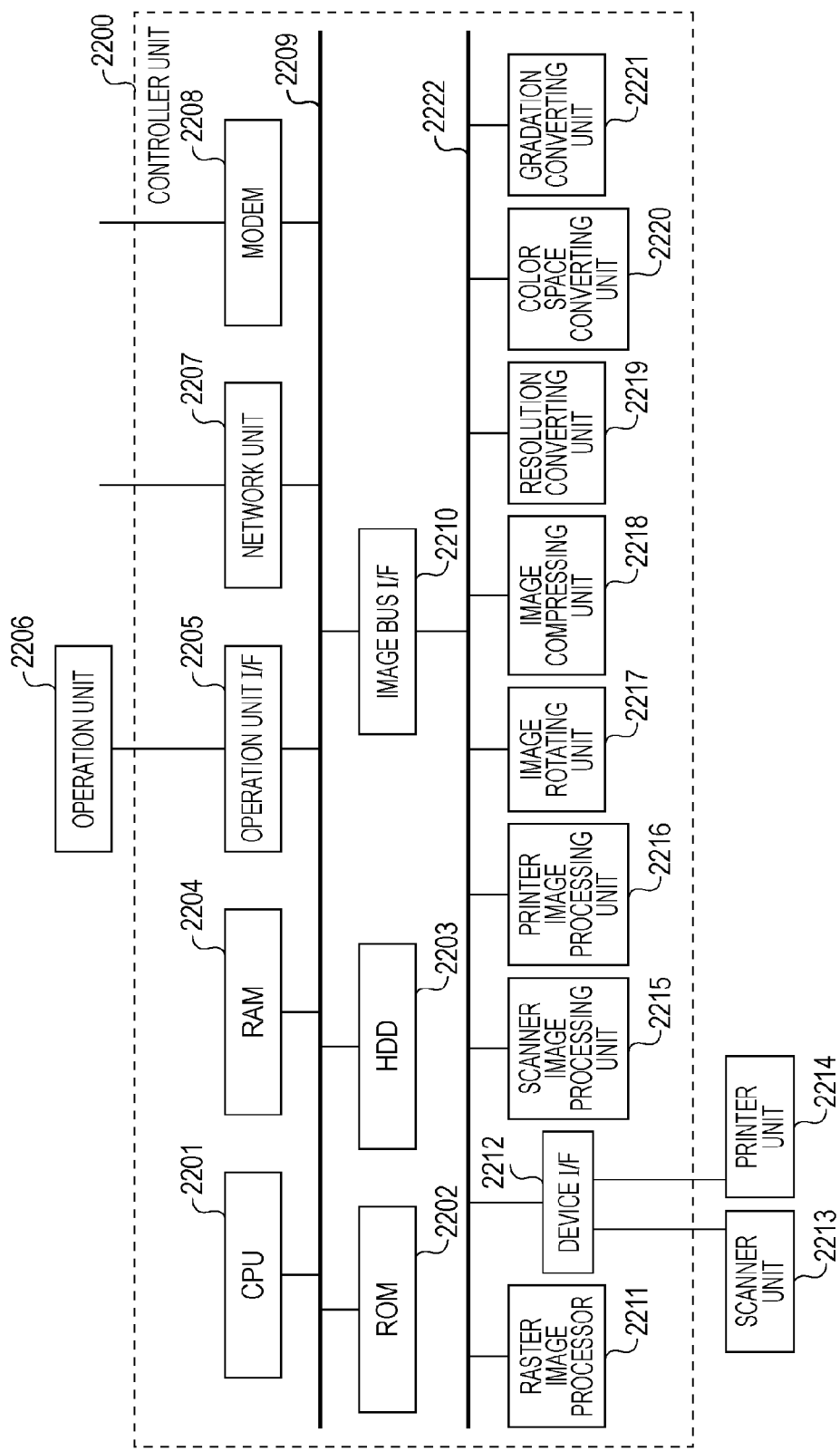
FIG. 18 is a diagram showing an example of a hardware configuration of an MFP 1604.

FIG. 18 is a diagram showing an example of a hardware configuration of the MFP 1604 shown in FIG. 16A.

Referring to FIG. 18, the MFP 1604 includes a controller unit 2200, an operation unit 2206, a scanner unit 2213, and a printer unit 2214. The controller unit 2200 includes a CPU 2201, a ROM 2202, an HDD 2203, a RAM 2204, a network unit 2207, a modem 2208, a scanner image processing unit 2215, and a printer image processing unit 2216.

The controller unit 2200 connects the scanner unit 2213 serving as an image inputting device to the printer unit 2214 serving as an image outputting device, thereby performing scanning of an original images (scanning operation) and formation of an image (copy/printing operation). On the other hand, the controller unit 2200 connects the network (LAN) 1608 to a public network (wide area network), thereby realizing exchange of various kinds of information between the MFP 1604 and an external apparatus.

Figure 19:
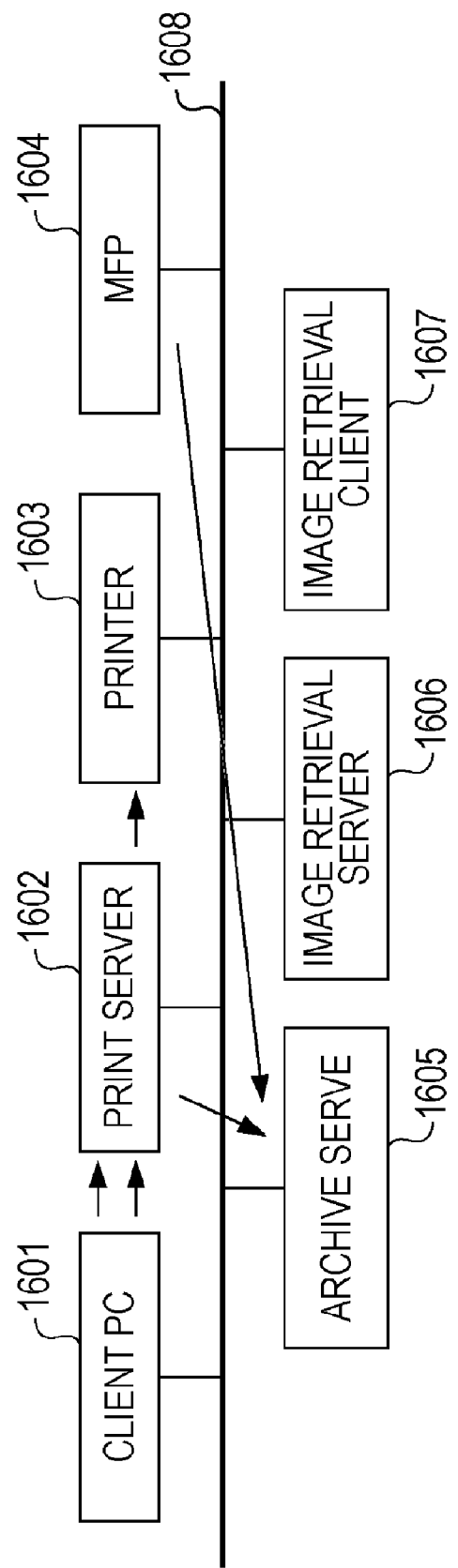
FIG. 19 is a diagram showing an example of a flow of job tracking information and print data in a job history management system.

The CPU 2201 of the controller unit 2200 is a controller for controlling the system. The RAM 2204 serves as a system work memory for the operation of the CPU 2201 and an image memory (buffer memory) for temporarily storing input image data. The ROM 2202 is configured as a boot ROM and stores a boot program of the system. The HDD 2203 stores system software and image data. The HDD 2203 also temporarily stores job tracking information (job log information and image information of job output content) acquired by the MFP 1604 and transfers the job tracking information to the archive server 1605 as shown in FIG. 19 through the MFP agent shown in FIG. 17E.

An operation unit I/F 2205 serves as an interface of the controller unit 2200 and the operation unit 2206, and outputs image data to be displayed to the operation unit 2206. The operation unit I/F 2205 also has a function for transmitting information input by users through the operation unit 2206 to the CPU 2201. The network unit 2207 connects the MFP 1604 to the network (LAN) 1608 to exchange information. The modem 2208 connects the MFP 1604 to a public network (WAN) to exchange image information. An image bus I/F 2210 connects a system bus 2209 to an image bus 2222 and serves as a bus bridge for converting a data structure. The above-described devices are arranged on the system bus 2209.

The image bus 2222 transfers image data at a high speed. The image bus 2222 may be a bus according to the PCI standard or the IEEE 1394 standard. The following devices are arranged on the image bus 2222. A raster image processor (RIP) 2211 converts a page description language (PDL) code into a bitmap image. A device I/F 2212 connects the scanner unit 2213 and the printer unit 2214 to the controller unit 2200 to convert synchronous/asynchronous image data.

The scanner image processing unit 2215 corrects, processes, and edits input image data resulting from scanning of an original by the scanner unit 2213. The scanner image processing unit 2215 also has a function for determining whether the input image data is image data of a color original document or a black-and-white original document on the basis of a saturation signal and storing the result. The printer image processing unit 2216 corrects, processes, and edits output image data to be printed by the printer unit 2214.

An image rotating unit 2217 rotates image data at the same time of scanning of an image by the scanning unit 2213 in cooperation with the scanner image processing unit 2215 and stores the rotated image data in a memory. In addition, the image rotating unit 2217 rotates image data stored in the memory and stores the rotated image data in the memory. Alternatively, the image rotating unit 2217 allows the printer unit 2214 to print image data after rotating the image data stored in the memory in cooperation with the printer image processing unit 2216.

An image compressing unit 2218 performs compression/decompression processing on multilevel image data according to the JPEG standard. The image compressing unit 2218 also performs compression/decompression processing on bilevel image data according to the JBIG, MMR, MR, or MH standard.

A resolution converting unit 2219 converts resolution of image data stored in a memory, and stores the resolution-converted image data in the memory. A color space converting unit 2220 converts, for example, YUV image data stored in a memory into Lab image data using a matrix, and stores the Lab image data in the memory. A gradation converting unit 2221 converts, for example, 8-bit 256-level image data stored in a memory into 1-bit bilevel image data using a method, such as error diffusion processing, and stores the bilevel image data in the memory.

The image rotating unit 2217, the image compressing unit 2218, the resolution converting unit 2219, the color space converting unit 2220, and the gradation converting unit 2221 can operate in cooperation with each other. For example, when the resolution of image data stored in a memory is converted after rotation of the image data, the image rotation processing and resolution converting processing can be performed without using a memory.

Figure 17E:
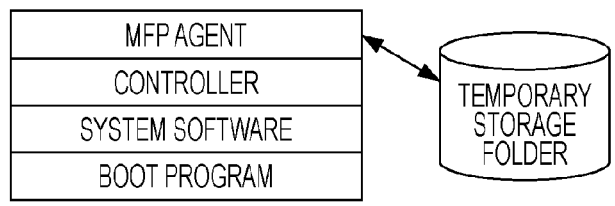

FIG. 17E is a diagram showing an example of a module configuration of software operating in the MFP 1604 shown in FIG. 18.

Referring to FIG. 17E, a boot program stored in the ROM 2202 and basic software, such as system software, stored in the HDD 2203 are executed by the CPU 2201 of the MFP 1604. Controller software (firmware) (simply shown as a controller in FIG. 17E) is executed on the basic program by the CPU 2201 using the RAM 2204. Furthermore, an MFP agent is executed on the controller software by the CPU 2201 using the RAM 2204. The MFP agent provides a function for transferring job tracking information temporarily stored in the HDD 2203 to the archive server 1605.

FIG. 19 is a diagram showing an example of a flow of job tracking information and print data in the job history management system.

Referring to FIG. 19, in response to a user's print instruction entered on the client PC 1601, print data of the print job is transmitted to the printer 1603 through the print server 1602 and is printed by the printer 1603. On the other hand, job tracking information of the print job is transmitted from the add-in module of the client PC 1601 to the driver agent of the print server 1602 and is temporarily stored in a temporary storage folder of the print server 1602 (see FIG. 17A).

The driver agent of the print server 1602 then transmits the job tracking information to the archive server 1605 according to a predetermined schedule. The service provider (see FIG. 17B) of the archive server 1605 receives the job tracking information and stores the job tracking information in the backend DB after performing image processing on the job tracking information.

The image registration service of the image retrieval server 1606 extracts feature amounts of a retrieval-target image from a document image included in the job tracking information stored in the backend DB and registers the extracted feature amounts in the feature amount DB (see FIG. 17C). At the time of the image retrieval, a retrieval result based on comparison of the feature amounts of the retrieval-target image registered in the feature amount DB with feature amounts of a verification-target image is calculated.

When a user performs an operation for instructing execution of a job, such as copying or transmission, in the MFP 1604, the instructed job is executed in the MFP 1604. The controller software (see FIG. 17E) of the MFP 1604 extracts job tracking information and temporarily stores the job tracking information in a temporary storage folder of the HDD 2203. The MFP agent then transmits the job tracking information to the archive server 1605. The processing flow performed thereafter is the same as that performed when the client PC 1601 performs a printing operation.

FIG. 20 is a diagram showing an example of job log information included in job tracking information shown in FIG. 19.

FIG. 20 shows an example of the job log information of the job tracking information in a table format. The job log information includes a job type indicating a type of a job (copy, print, scan, or transmission), a job start date, a job start date/time, a print execution module name, a computer name, an IP address, a MAC address, a user name, a number of bits representing color, a printer name, a port name, and a location. The job log information also includes a file name to be output in the job. In the flow of the job tracking information shown in FIG. 19, the job log information in the table format shown in FIG. 20 is transmitted to the archive server 1605 and is stored together with image information or in association with image information in the backend DB.

An object of the present invention can be achieved in the following manner. More specifically, a computer-readable storage medium (computer-readable recording medium) storing a program code of software for realizing the functions of the above-described exemplary embodiments is supplied to a system or an apparatus. A central processing unit (a CPU or an MPU) of the system or the apparatus reads out and executes the program code stored on the computer-readable storage medium. In this case, the program code read out from the computer-readable storage medium realizes the functions of the above-described exemplary embodiments. Thus, the computer-readable storage medium storing the program code is included in the present invention.

By executing the program code read out by the central processing unit of the system or the apparatus, an operating system (OS) or the like operating in the system or the apparatus executes part of or all of actual processing on the basis of instructions of the program code. The present invention includes a case where the functions of the above-described exemplary embodiments are realized by the processing.

Furthermore, the program code read out from the computer-readable storage medium is written in a memory included in a function expansion card inserted into the system or the apparatus or a function expansion unit connected to the system or the apparatus. A CPU or the like of the function expansion card or the function expansion unit executes part of or all of actual processing on the basis of instructions of the program code. The present invention also includes a case where the functions of the above-described exemplary embodiments are realized by the processing.

When the present invention is applied to the computer-readable storage medium, the computer-readable storage medium stores program codes corresponding to steps of the above-described flowcharts.

According to each of the above-described exemplary embodiments, it is possible to accurately determine whether a page image includes a picture or not at a high speed.

Although an example of using the RGB color space at the time of extraction of color feature amounts has been described in the above-described exemplary embodiments, the color space is not limited to this particular example. More specifically, the color feature amounts may be extracted using other color spaces, such as the L*a*b color space, the L*u*v color space, and a JCh color space. Although an example of extracting an average color as a representative color has been described, a most frequently appearing color of a block may be used as the representative color or a color represented by the maximum value or the minimum value may be used as the representative color.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-163665 filed on Jun. 23, 2008, which is hereby incorporated by reference herein in its entirety.

What is claimed is:

1. An image processing apparatus comprising:
   an acquiring unit configured to acquire a page image;
   an extracting unit configured to extract area information from the page image acquired by the acquiring unit, the area information including information on existence or absence of a text area and a picture area;
   a calculating unit configured to divide the page image into a plurality of blocks and calculate an image feature value of each of the divided blocks; and
   a determining unit configured to determine, on the basis of the area information extracted by the extracting unit and the image feature value of each of the divided blocks calculated by the calculating unit, whether the page image includes a picture area, wherein, when the determining unit determines that the page image does not include a picture area on the basis of the area information extracted by the extracting unit, the determining unit extracts a block not overlapping a text area on the basis of the area information extracted by the extracting unit, and determines whether the page image includes a picture area on the basis of the image feature value of the extracted block.

2. The apparatus according to claim 1, wherein, when the determining unit determines that the page image does not include a picture area on the basis of the area information extracted by the extracting unit, the determining unit extracts blocks not overlapping a text area on the basis of the area information extracted by the extracting unit, and determines whether the page image includes a picture area on the basis of an image feature value of the extracted blocks excluding outermost blocks.

3. The apparatus according to claim 1, wherein the calculating unit calculates an image feature value of each of the divided blocks on the basis of color information of pixels included in the block.

4. The apparatus according to claim 1, wherein the calculating unit calculates an image feature value of each of the divided blocks on the basis of luminance information of pixels included in the block.

5. The apparatus according to claim 1, wherein the calculating unit calculates an image feature value of each of the divided blocks on the basis of edge information of the block.

6. The apparatus according to claim 1, further comprising:
   a registering unit configured to register the page image in a storage device in association with the image feature values of the blocks of the page image when the determining unit determines that the page image includes a picture area.

7. An image processing method comprising:
   acquiring a page image;
   extracting area information from the acquired page image, the area information including information on existence or absence of a text area and a picture area;
   dividing the page image into a plurality of blocks and calculating an image feature value of each of the divided blocks; and
   determining, on the basis of the extracted area information and the calculated image feature value of each of the divided blocks, whether the page image includes a picture area, wherein, when it is determined that the page image does not include a picture area on the basis of the extracted area information, a block not overlapping a text area is extracted on the basis of the extracted area information, and whether the page image includes a picture area is determined on the basis of the image feature value of the extracted block.

8. The method according to claim 7, wherein, when it is determined that the page image does not include a picture area on the basis of the extracted area information, blocks not overlapping a text area are extracted on the basis of the extracted area information, and whether the page image includes a picture area is determined on the basis of an image feature value of the extracted blocks excluding outermost blocks.

9. The method according to claim 7, wherein an image feature value of each of the divided blocks is determined on the basis of color information of pixels included in the block.

10. The method according to claim 7, wherein an image feature value of each of the divided blocks is calculated on the basis of luminance information of pixels included in the block.

11. The method according to claim 7, wherein an image feature value of each of the divided blocks is calculated on the basis of edge information of the block.

12. The method according to claim 7, further comprising:
registering the page image in a storage device in association with the image feature amounts of the blocks of the page image when it is determined that the page image includes a picture area.

13. A non-transitory computer-readable storage medium storing a program causing a computer to execute a method, the method comprising:

acquiring a page image;

extracting area information from the acquired page image, the area information including information on existence or absence of a text area and a picture area;

dividing the page image into a plurality of blocks and calculating an image feature amount of each of the divided blocks; and determining, on the basis of the extracted area information and the calculated image feature value of the divided blocks, whether the page image includes a picture area, wherein, when it is determined that the page image does not include a picture area on the basis of the extracted area information, a block not overlapping a text area is extracted on the basis of the extracted area information, and whether the page image includes a picture area is determined on the basis of the image feature value of the extracted block.

* * * * *